(12) United States Patent
Endo et al.

(10) Patent No.: US 9,582,502 B2
(45) Date of Patent: Feb. 28, 2017

(54) TRANSLATION METHOD AND TRANSLATION SYSTEM FOR TRANSLATING INPUT EXPRESSION INTO EXPRESSION IN ANOTHER LANGUAGE

(71) Applicant: Panasonic Intellectual Property Corporation of America, Torrance, CA (US)

(72) Inventors: Mitsuru Endo, Osaka (JP); Viviane Oliveira, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/849,584

(22) Filed: Sep. 9, 2015

(65) Prior Publication Data
US 2016/0092437 A1 Mar. 31, 2016

(30) Foreign Application Priority Data

Sep. 26, 2014 (JP) ................................. 2014-197189

(51) Int. Cl.
*G06F 17/28* (2006.01)
*G06F 9/44* (2006.01)
*G06F 17/27* (2006.01)

(52) U.S. Cl.
CPC ......... *G06F 17/289* (2013.01); *G06F 17/2854* (2013.01); *G06F 9/4448* (2013.01); *G06F 17/2755* (2013.01); *G06F 17/2827* (2013.01); *G06F 17/2872* (2013.01)

(58) Field of Classification Search
CPC  G06F 17/289; G06F 17/2872; G06F 17/2755; G06F 17/2827; G06F 17/271; G06F 9/4448; G06F 17/275; G06F 17/2863
USPC ................................................ 704/2, 4, 5, 8
See application file for complete search history.

(56) References Cited

U.S. PATENT DOCUMENTS

| 2008/0208565 | A1 | 8/2008 | Bisegna |
| 2014/0100843 | A1 | 4/2014 | Tanaka |
| 2014/0350913 | A1* | 11/2014 | Cheng ................... G06F 17/289 704/2 |

FOREIGN PATENT DOCUMENTS

| JP | 2005-078318 | 3/2005 |
| JP | 2006-053683 | 2/2006 |
| JP | 2008-511883 | 4/2008 |
| JP | 2014-078132 | 5/2014 |

* cited by examiner

*Primary Examiner* — Vu B Hang
(74) *Attorney, Agent, or Firm* — Greenblum & Bernstein, P.L.C.

(57) ABSTRACT

A translation system includes translation subsystems by a plurality of translation policies with different translation output tendencies, performs forward translation and reverse translation by a consistent translation policy, and ranks the plurality of translation policies based on a similarity between the reverse translation sentences and the original sentence. As a result, a translation policy that best matches each input object to be translated is selected from the plurality of translation policies for each input sentence and, as a consequence, it is possible to cover a wide range of natures of sentences to be translated.

15 Claims, 7 Drawing Sheets

|  | CORRECT TRANSLATION BY POLICY A | INCORRECT TRANSLATION BY POLICY A | |
|---|---|---|---|
| CORRECT TRANSLATION BY POLICY B | 74% | 11% | ~402 |
| INCORRECT TRANSLATION BY POLICY B | 14% | 4% | ~404 |

|  | POLICY A | POLICY B | OPTIMUM SELECTION |
|---|---|---|---|
| ACCURACY RATE | 88% | 85% | 96% |

|  | TRANSLATION SENTENCE | REVERSE TRANSLATION SENTENCE | POLICY RANKING |
|---|---|---|---|
| POLICY A | IS IT HOW TO WALK TO NAGOYA STATION? | NAGOYA-EKI MADE ARUKU HOHO DE ARUKA? | SECOND PLACE |
| POLICY B | HOW LONG DOES IT TAKE TO WALK TO THE NAGOYA STATION? | NAGOYA-EKI MADE ARUITE DONOKURAI KAKARIMASUKA? | FIRST PLACE |

FIG. 7

|  | TRANSLATION SENTENCE | REVERSE TRANSLATION SENTENCE | POLICY RANKING |
|---|---|---|---|
| POLICY A | DEVICE THAT DETERMINES RESPIRATORY CYCLES | KOKYUSHUKI WO KETTEISURU SOCHI | FIRST PLACE |
| POLICY B | A DEVICE THAT MEETS THE REQUIREMENTS OF THE TEST FOR RESPIRATORY PHASES | KOKYUSO NO SHIKEN NO HITSUYOJOKEN WO MITASHITEIRUKOTO WO SOCHI WO TEIKYOSURU | SECOND PLACE |

TRANSLATION METHOD AND TRANSLATION SYSTEM FOR TRANSLATING INPUT EXPRESSION INTO EXPRESSION IN ANOTHER LANGUAGE

BACKGROUND

1. Technical Field

The present disclosure relates to a translation method and a translation system that translate an input expression into an expression in another language.

2. Description of the Related Art

There is a system that outputs a plurality of translation sentences when performing machine translation from a first language to a second language. Moreover, there is a system that automatically evaluates the reliability of the translation sentence. In Japanese Unexamined Patent Application Publication No. 2006-53683, a technique of outputting N-best translation sentences in statistical machine translation is disclosed. In Japanese Unexamined Patent Application Publication No. 2014-78132, a technique of calculating the degree of similarity between a reverse translation sentence obtained by performing reverse translation (from a second language to a first language) of a translation sentence and a pre-translation original sentence and using the degree of similarity for the evaluation of the reliability of the translation sentence is disclosed.

SUMMARY

However, a further study has been required to improve the accuracy of translation.

In one general aspect, the techniques disclosed here feature a translation method including: obtaining an original sentence to be translated; performing bidirectional translation by obtaining a translation sentence corresponding to the original sentence by performing forward translation and obtaining a reverse translation sentence from the translation sentence by performing reverse translation, for each of a plurality of translation policies; ranking the translation policies based on the degree of similarity between the reverse translation sentences by the plurality of translation policies and the original sentence; and displaying the translation sentences by the plurality of translation policies in a state in which each translation sentence is related to the ranking, in which the forward translation and the reverse translation are performed consistently for each translation policy.

It is possible to perform highly accurate translation.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Underlying Knowledge Forming Basis of the Present Disclosure)

Translation techniques adopting various approaches such as rule-based translation and bilingual corpus-based translation have been studied. However, in translation service, as the nature of a sentence to be translated, for a style (written language/spoken language), the field of contents (medical care, phrases for tourists, and patent), the length of a sentence, the complexity of syntax, the specialized nature of a term, and so forth, there are various needs. No study on technical solutions to cover these various needs has been conducted.

For example, with the method proposed in Japanese Unexamined Patent Application Publication No. 2006-53683, since it is possible to obtain N translation sentences within an N-best framework, there is a possibility that, even when the first result is incorrect, a correct translation can be extracted from the lower-order candidates. Moreover, with the method proposed in Japanese Unexamined Patent Application Publication No. 2014-78132, it is possible to evaluate the reliability of a translation sentence in the framework of reverse translation. It appears to be able to improve the accuracy by combining these techniques. However, in a configuration obtained by combining these techniques, since N translation results obtained by one translation policy are similar to one another, even when the ranking is changed by using the reverse translation results, the configuration has less room to improve the accuracy as compared to the original accuracy of 1-best translation.

In order to solve such a problem, a translation method includes: obtaining an original sentence to be translated; performing bidirectional translation by obtaining a translation sentence corresponding to the original sentence by performing forward translation and obtaining a reverse translation sentence from the translation sentence by performing reverse translation, for each of a plurality of translation policies; ranking the translation policies based on the degree of similarity between the reverse translation sentences by the plurality of translation policies and the original sentence; and displaying the translation sentences by the plurality of translation policies in a state in which each translation sentence is related to the ranking, in which the forward translation and the reverse translation are performed consistently for each translation policy.

Moreover, in the performing bidirectional translation, if the original sentence is written in a first language, a first translation sentence may be obtained by translating the original sentence into a second language by a first translation policy, a first reverse translation sentence may be obtained by performing reverse translation of the first translation sentence into the first language by the first translation policy, a second translation sentence may be obtained by translating the original sentence into the second language by a second translation policy, and a second reverse translation sentence may be obtained by performing reverse translation of the second translation sentence into the first language by the second translation policy.

Furthermore, in the ranking, the first degree of similarity between the original sentence and the first reverse translation sentence may be calculated, the second degree of similarity between the original sentence and the second reverse translation sentence may be calculated, and the first degree of similarity and the second degree of similarity may be compared and the first translation sentence and the second translation sentence may be ranked in descending order of degree of similarity.

In addition, in the displaying, the first translation sentence and the second translation sentence ranked in the ranking may be displayed in such a way that a translation sentence in a higher rank is displayed in an upper portion.

Moreover, the degree of similarity may be a value obtained by subtracting the number of disparities in units of words between the reverse translation sentence and the original sentence from the number of matches in units of words between the reverse translation sentence and the original sentence.

Furthermore, the translation policy may be an algorithm reflecting a design guide in machine translation.

In addition, a translation system includes: an input portion that obtains an original sentence as an input; a plurality of bidirectional translation subsystems corresponding to a plurality of different translation policies; a translation policy ranker that ranks the plurality of translation policies; and a result displaying portion that displays a translation sentence in accordance with the result of ranking of the translation policies, in which the bidirectional translation subsystems each obtain, for each translation policy, a translation sentence corresponding to the original sentence and a reverse translation sentence corresponding to the translation sentence, and the translation policy ranker ranks the translation policies based on the degree of similarity between a plurality of the reverse translation sentences and the original sentence.

As a result, a translation policy that best matches each input object to be translated is selected for each input sentence from among a plurality of translation policies, which makes it possible to cover the nature of the sentence to be translated widely as a whole.

Here, the translation policy is an algorithm reflecting a design guide of machine translation. Incidentally, a designer does not have to be conscious of this design guide. For example, as the machine translation method, there are rule-based translation and statistics-based translation, which have different specialized objects to be translated. Rule-based translation is a method of converting an input sentence in one language into an output sentence in another language by a manually-written rule. Statistics-based translation is a method of converting an input sentence in one language into an output sentence in another language by using a translation rule calculated by statistical study using a corpus of two languages. Moreover, since translations by the same statistics-based translation have different specialized objects to be translated if different corpora based on which the amount of statistics is determined are used, these translations are examples adopting different policies. Furthermore, various biases, such as the difference between a case in which a word is used as a basic unit of translation and a case in which a phrase is used as a basic unit of translation, which vary the output tendency can become a difference in policy. In general, the translation policies are integrated into one policy which the designer believes the best, but one policy has a limitation in accuracy for various inputs.

Incidentally, an embodiment which will be described below illustrates one specific example of the present disclosure. The numerical values, shapes, component elements, steps, order of steps, and so forth which are described in the following embodiment are mere examples and are not meant to limit the present disclosure. Moreover, of the component elements in the following embodiment, a component element which is not described in an independent claim describing the broadest concept of the present disclosure is described as an arbitrary component element. Furthermore, in all the embodiments, it is also possible to combine the contents thereof.

(Overview of Service which is Provided)

Figure 1A:
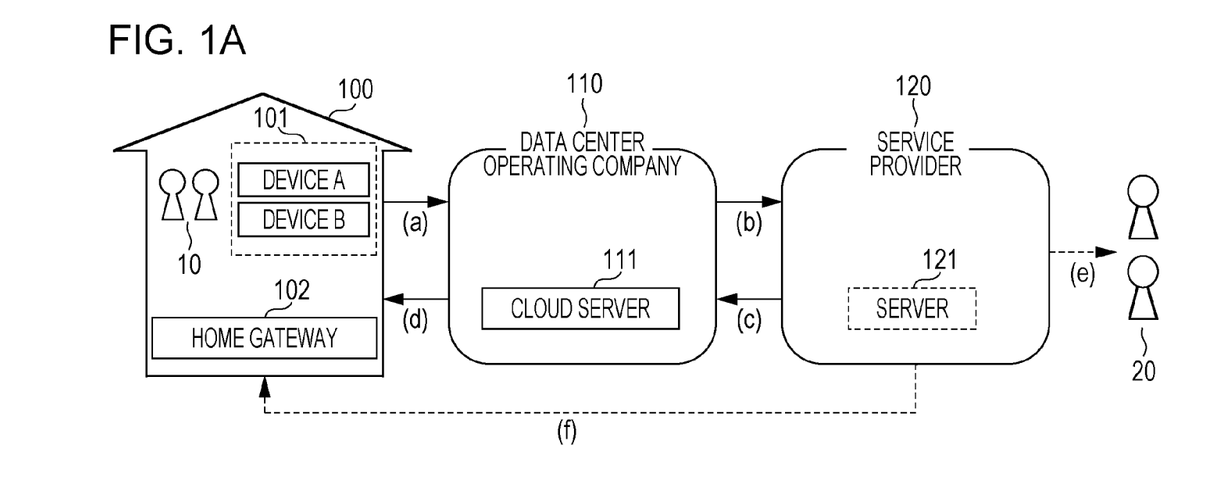
FIGS. 1A to 1C depict the overview of a translation system in an embodiment.

In FIG. 1A, an overview of an information providing system in this embodiment is depicted.

A group 100 is, for example, a company, an organization, or a household and the size thereof does not matter. In the group 100, a device A and a device B which are a plurality of devices 101 and a home gateway 102 are present. As the plurality of devices 101, there are a device (for example, a smartphone, a PC, a TV, or the like) which is connectable to the Internet and a device (for example, a lighting fixture, a washing machine, a refrigerator, or the like) which is not connectable to the Internet by itself. There may be a device that is a device which is not connectable to the Internet by itself but is connectable to the Internet via the home gateway 102. Moreover, in the group 100, a user 10 who uses the plurality of devices 101 is present.

Figure 1B:
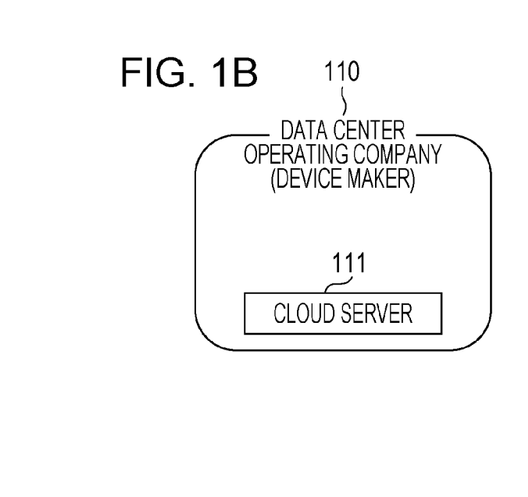
Figure 1C:
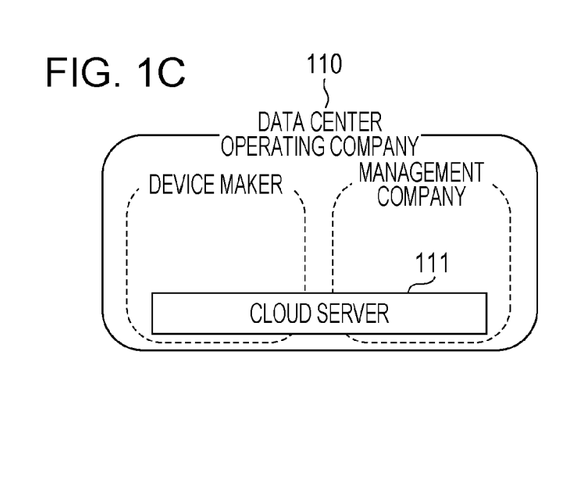

In a data center operating company 110, a cloud server 111 is present. The cloud server 111 is a virtualized server that cooperates with various devices via the Internet. The cloud server 111 mainly manages, for example, big data that is difficult to be handled by a normal database management tool or the like. The data center operating company 110 performs the data management and the management of the cloud server 111 and operates a data center performing such management, for example. The details of the service performed by the data center operating company 110 will be described later. Here, the data center operating company 110 is not limited to a company that performs only the data management, the operation of the cloud server 111, and so forth. For example, if a device maker that develops and produces one of the plurality of devices 101 also performs the data management, the management of the cloud server 111, and so forth, the device maker corresponds to the data center operating company 110 (FIG. 1B). Moreover, the data center operating company 110 is not limited to a single company. For example, if the device maker and the other management company perform the data management and the operation of the cloud server 111 in cooperation with each other or share the data management and the operation of the cloud server 111, it is assumed that both or any one of the device maker and the other management company corresponds to the data center operating company 110 (FIG. 1C).

A service provider 120 has a server 121. The size of the server 121 here does not matter and examples of the server 121 include memory in a personal computer. Moreover, sometimes the service provider 120 does not have the server 121.

Incidentally, in the above-described service, the home gateway 102 is not indispensable. For example, if the cloud server 111 performs all the data management, the home gateway 102 is not necessary. Moreover, like a case in which all the devices in the household are connected to the Internet, there is a case in which a device which is not connectable to the Internet by itself is not present.

Next, the flow of information in the above-described service will be described.

First, the device A or the device B of the group 100 transmits each log information to the cloud server 111 of the data center operating company 110. The cloud server 111 accumulates the log information of the device A or the device B (part (a) of FIG. 1A). Here, the log information is information indicating the operation status, the operation date and time, and so forth of the plurality of devices 101. Examples of the log information include a history of television viewing, information on programmed recording performed by a recorder, the operation date and time and the amount of laundry of a washing machine, the opening and closing date and time and the number of opening and closing operations of a refrigerator, and so forth, but the log information is not limited thereto; the log information refers to all the information which can be obtained from all devices. The log information is sometimes provided directly to the cloud server 111 from the plurality of devices 101 themselves via the Internet. Moreover, the log information may be temporarily accumulated in the home gateway 102 from the plurality of devices 101 and then provided to the cloud server 111 from the home gateway 102.

Next, the cloud server 111 of the data center operating company 110 provides the accumulated log information to the service provider 120 in a fixed unit. Here, the unit may be a unit by which the data center operating company 110 can organize the accumulated information and provide the organized information to the service provider 120 or a unit requested by the service provider 120. The unit may not be a fixed unit, and the amount of information to be provided may vary depending on the situation. The log information is stored in the server 121 of the service provider 120 if necessary (part (b) of FIG. 1A). Then, the service provider 120 organizes the log information to obtain information that suits to a service to be provided to the user and provides the service to the user. The user to which the service is provided may be the user 10 who uses the plurality of devices 101 or an external user 20. As the method for providing the service to the user, for example, the service may be provided directly to the user from the service provider 120 (part (b) and part (e) of FIG. 1A). Moreover, as the method for providing the service to the user, for example, the service may be provided to the user via the cloud server 111 of the data center operating company 110 again (part (c) and part (d) of FIG. 1A). Furthermore, the cloud server 111 of the data center operating company 110 may organize the log information to obtain information that suits to a service to be provided to the user and provide the information to the service provider 120.

Incidentally, the user 10 and the user 20 may be different users or one and the same user.

(First Embodiment)

Figure 2A:
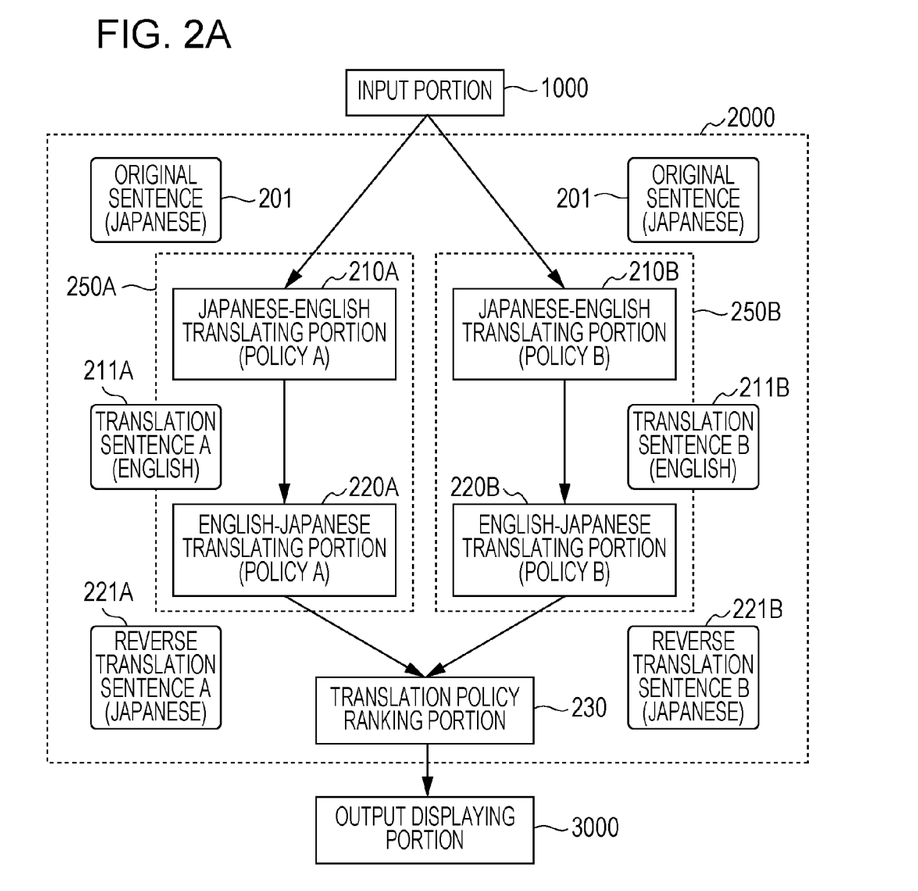
FIGS. 2A and 2B are block diagrams depicting the schematic configuration of the translation system in this embodiment.
Figure 2B:
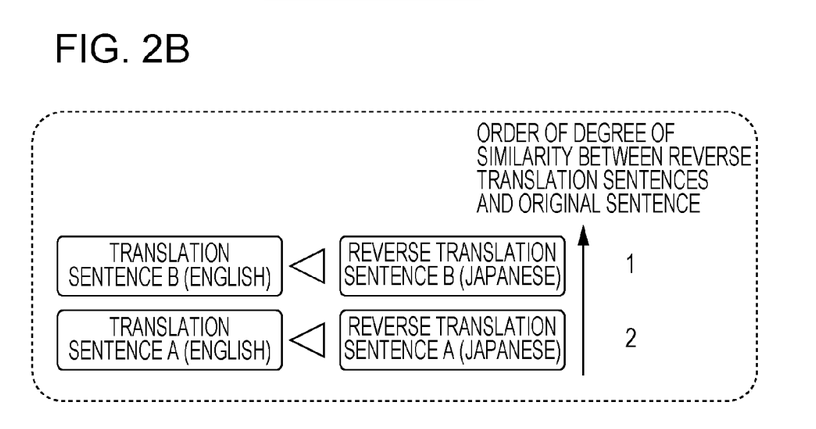

FIGS. 2A and 2B are block diagrams depicting a schematic configuration in this embodiment and depict an example of a system that performs Japanese-English translation.

This translation system includes an input portion 1000, a processing portion 2000, and an output displaying portion 3000. Incidentally, these configurations do not necessarily have to be provided collectively in one apparatus and may be distributed over any apparatuses such as the devices 101, the cloud server 111, the server 121, and so forth depicted in FIGS. 1A to 1C. For example, each device 101 (such as a smartphone) may include the input portion 1000 and the output displaying portion 3000, and the cloud server 111 (or the server 121) may include the processing portion 2000. In this case, by performing transmission and reception of information between the devices provided with a communication unit, processing of FIGS. 2A and 2B and FIG. 3, which will be described below, is implemented.

In FIG. 2A, the input portion 1000 accepts an input of an original sentence (Japanese) 201 to be translated and outputs the original sentence (Japanese) 201 to the processing portion 2000. Here, the input portion 1000 is, for example, a touch panel-type text input unit provided in the device 101. In this case, the user inputs, via a touch panel, a sentence which the user desires to translate. Then, the input sentence is transmitted to the processing portion 2000 of the cloud server 111 via an unillustrated communication unit. Incidentally, the input portion 1000 is not necessarily limited to the touch panel-type text input unit; in the case of a mobile terminal provided with a physical input button, the input button corresponds to the input portion 1000 and, in the case of a PC or the like, a keyboard or a mouse corresponds to the input portion 1000. Moreover, if the device 101 includes the processing portion 2000, there is no need to transmit the text information input by the input portion 1000 to the cloud server 111 or the like. Furthermore, the input portion 1000 is not limited to the text input unit and may be a sound pickup apparatus (a microphone) or the like for voice recognition. In this case, in a voice recognition unit (not depicted in the drawing) in the device 101 or the cloud server 111, the obtained voice is converted into text and is then output to the processing portion 2000.

The processing portion 2000 is provided in the cloud server 111 (the server 120) as described above and receives the information input by the input portion 1000 of the device 101 and processes the information. The processing portion 2000 includes a Japanese-English translating portion 210A, a Japanese-English translating portion 210B, an English-Japanese translating portion 220A, an English-Japanese translating portion 220B, and a translation policy ranking portion 230.

The Japanese-English translating portion 210A (a policy A) performs Japanese-English translation of the original sentence (Japanese) 201 input by the input portion 1000 in accordance with a policy A and obtains a translation sentence A (English) 211A. Then, the Japanese-English translating portion 210A outputs the translation sentence A (English) 211A to the English-Japanese translating portion 220A.

The English-Japanese translating portion 220A (the policy A) performs English-Japanese translation of the translation sentence A (English) 211A output from the Japanese-English translating portion 210A in accordance with the policy A and obtains a reverse translation sentence A (Japanese) 221A. Then, the English-Japanese translating portion 220A outputs the reverse translation sentence A (Japanese) 221A to the translation policy ranking portion 230.

The Japanese-English translating portion (a policy B) 210B performs, in accordance with a policy B, Japanese-English translation of the original sentence (Japanese) 201 similar to the original sentence subjected to translation in the Japanese-English translating portion 210A and obtains a translation sentence B (English) 211B. Then, the Japanese-English translating portion 210B outputs the translation sentence B (English) 211B to the English-Japanese translating portion 220B.

The English-Japanese translating portion 220B (the policy B) performs English-Japanese translation of the translation sentence B (English) 211B output from the Japanese-English translating portion 210B in accordance with the policy B and obtains a reverse translation sentence B (Japanese) 221B. Then, the English-Japanese translating portion 220B outputs the reverse translation sentence B (Japanese) 221B to the translation policy ranking portion 230.

The translation policy ranking portion 230 ranks the translation policies.

Translation policy ranking is performed by sorting out the degrees of similarity between the reverse translation sentences obtained by the policies and the original sentence, and ranking of the translation sentences is performed based on the ranking of the policies (depicted in FIG. 2B). Here, the Japanese-English translating portion 210A and the English-Japanese translating portion 220A can perform bidirectional translation and are collectively referred to as a bidirectional translation subsystem 250A by the policy A, and the Japanese-English translating portion 210B and the English-Japanese translating portion 220B can perform bidirectional translation and are collectively referred to as a bidirectional translation subsystem 250B by the policy B. Here, a method of sorting out the degrees of similarity is not limited to a particular method. For example, a degree of similarity may be calculated based on the value obtained by subtracting the number of disparities (the sum of deletion and insertion) in units of characters from the number of matches in units of characters. A specific example of calculation of a degree of similarity will be described later.

The output displaying portion 3000 receives the information ranked by the translation policy ranking portion 230 and displays a plurality of translation results in accordance with the ranking of translation policies. Moreover, the output displaying portion 3000 may display the plurality of translation results in accordance with the ranking and perform display urging the user to select an optimum translation result. A specific display example which is displayed by the output displaying portion 3000 will be described later. Here, the output displaying portion 3000 may be included, for example, in the device 101 provided with the input portion 1000; if the device 101 provided with the input portion 1000 is a device provided with no display portion, a device other than the device 101 may include the output displaying portion 3000. If the processing portion 2000 and the output displaying portion 3000 are not included in one apparatus, the output displaying portion 3000 receives the results obtained by ranking performed by the processing portion 2000 and the translation results by an unillustrated communication unit and then displays the plurality of translation results in accordance with the ranking of translation policies.

With such a configuration, by performing consistent translation and reverse translation for each of the plurality of translation policies, it is possible to perform ranking of translation policies by the translation policy ranking portion 230 and select a translation policy that well matches the original sentence for each input. Therefore, by using a plurality of policies which are different in nature, it is possible to deal with variations in input.

Here, if reverse translation of the translation sentence obtained by the Japanese-English translating portion 210A is performed by the English-Japanese translating portion 220B or reverse translation of the translation sentence obtained by the Japanese-English translating portion 210B is performed by the English-Japanese translating portion 220A, it is possible to improve the accuracy of reverse translation, but, in this case, ranking of the translation sentence A and the translation sentence B, not ranking of the policy A and the policy B, is performed, which is different from what is aimed by the present disclosure. By performing translation and reverse translation by a consistent policy, it is expected that, for example, if translation is successfully performed by the policy A and translation is not successfully performed by the policy B, reverse translation A is also performed successfully and reverse translation B is also not successfully performed. It can be expected that, when, in particular, translation is not successfully performed, since reverse translation of the unsatisfactory translation result is further performed, a lower-quality translation result is obtained, which causes a great difference between the case in which translation is successfully performed and the case in which translation is not successfully performed.

Moreover, for example, even when there is a high possibility that a long sentence can be successfully translated by the policy A and a short sentence can be successfully translated by the policy B, a certain long sentence can be successfully translated by the policy B depending on an input sentence, which is the reason for selecting a translation policy for each input. Incidentally, as for the translation policy, the above-described rule-based translation and statistics-based translation may be used for the policy A and the policy B. Moreover, a translation policy different from the policy A and the policy B may be used. Furthermore, even when both the policy A and the policy B are statistics-based translation policies, it is simply necessary to make the policy A and the policy B use different corpora based on which the amount of statistics is determined. That is, any translation policy may be adopted unless the policy A and the policy B are one and the same translation policy.

Figure 3:
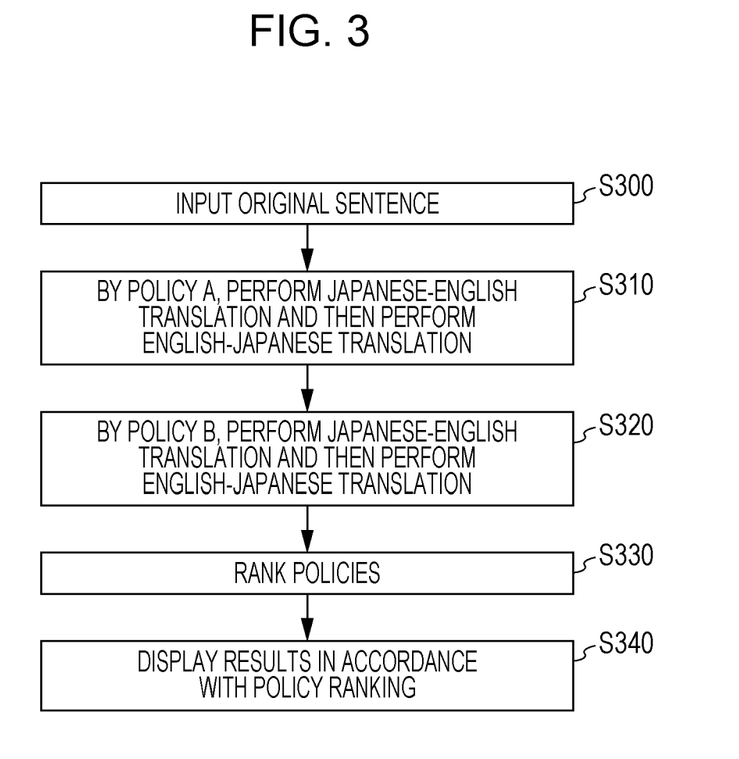
FIG. 3 is a flowchart of the translation system in this embodiment.

In FIG. 3, a flowchart of the translation system in this embodiment is depicted. With reference to this flowchart, the operation procedure of the translation system will be described by using an example of Japanese-English translation.

First, the translation system obtains a Japanese original sentence to be translated as an input (step S300). Next, the translation system obtains a translation sentence A by performing Japanese-English translation of the original sentence by the policy A and then obtains a reverse translation sentence A by performing English-Japanese translation of the translation sentence A by the policy A (step S310). Then, the translation system obtains a translation sentence B by performing Japanese-English translation of the original sentence by the policy B and then obtains a reverse translation sentence B by performing English-Japanese translation of the translation sentence B by the policy B (step S320). Next, the translation system ranks the policy A and the policy B by using the original sentence, the reverse translation sentence A, and the reverse translation sentence B (step S330). Then, the translation system displays the translation results in accordance with the policy ranking results (step S340). For example, if the policy A is ranked in the first place and the policy B is ranked in the second place by policy ranking, the translation system displays the translation sentence A which is the result of the Japanese-English translation by the policy A in the first line of a translation result display area of the output displaying portion 3000 and displays the translation sentence B which is the result of the Japanese-English translation by the policy B in the second line of the translation result display area.

Figure 4:
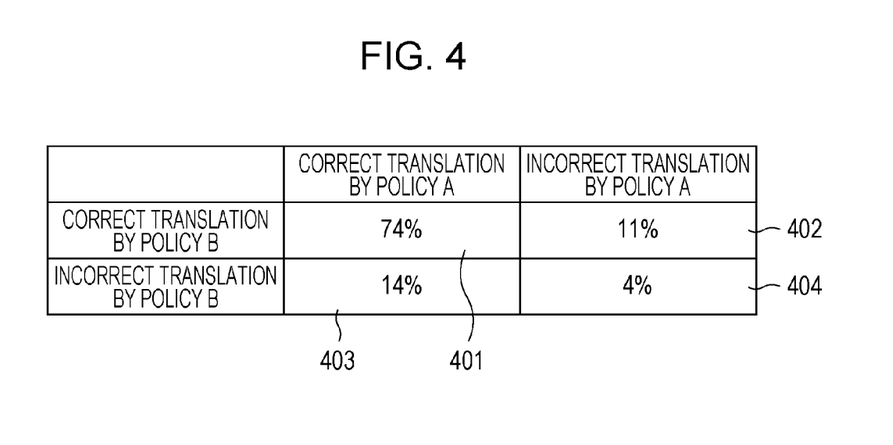
FIG. 4 is a table for explaining the effect obtained by combining a plurality of policies of the translation system in this embodiment.

In FIG. 4, a table for explaining the effect of combining the plurality of policies of the translation system in this embodiment is depicted.

Assume that, for evaluating the performance of the translation system, for example, 100 sentences are prepared, translation by the policy A and translation by the policy B are performed, and the translation results are classified into correct translation and incorrect translation at the judgment of an evaluator. In FIG. 4, a column 401 indicates the percentage of input sentences in which both of the translation results by the policy A and the policy B are classified into correct translation, a column 404 indicates the percentage of input sentences in which both of the translation results by the policy A and the policy B are classified into incorrect translation, a column 402 indicates the percentage of input sentences in which only the results by the policy B are classified into correct translation, and a column 403 indicates the percentage of input sentences in which only the results by the policy A are classified into correct translation, and the percentages are 74%, 4%, 11%, and 14%.

Among them, the conditions of the column 401 and the column 404 are not important because the results indicate correct translation irrespective of the policy or the results indicate incorrect translation irrespective of the policy and the results are unaffected by the policy ranking. What is important is to operate the policy ranking in such a way that the policy outputting correct translation is highly ranked for the conditions of the column 402 and the column 403. Moreover, the higher the percentage in the column 402 and the column 403, the greater the effect of combining the policy A and the policy B.

Figure 5:
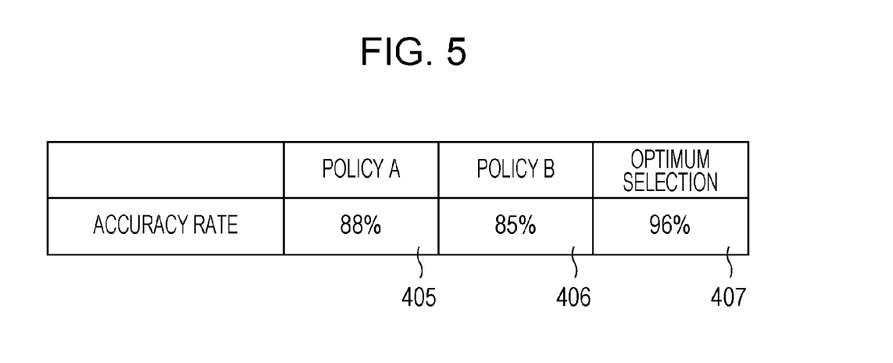
FIG. 5 is a table illustrating the difference in an accuracy rate between a single policy and the combined use of policies of the translation system in this embodiment.

In FIG. 5, a table illustrating the difference in an accuracy rate between a single policy and the combined use of policies of the translation system in this embodiment is depicted.

As for the ratio between correct translation and incorrect translation by the policy depicted in FIG. 4, the compilation thereof only for the policy A is listed in a column 405 and the compilation thereof only for the policy B is listed in a column 406, and the accuracy rate obtained when the policy A and the policy B are used together and the operation of the policy ranking is perfect is listed in a column 407; the ratios are 88% and 85% and the accuracy rate is 96%. That is, there is a possibility that, even when the accuracy of translation on the order of 80% is obtained by one policy, it is possible to obtain the accuracy of translation on the order of 90% by combining two policies.

Figure 6:
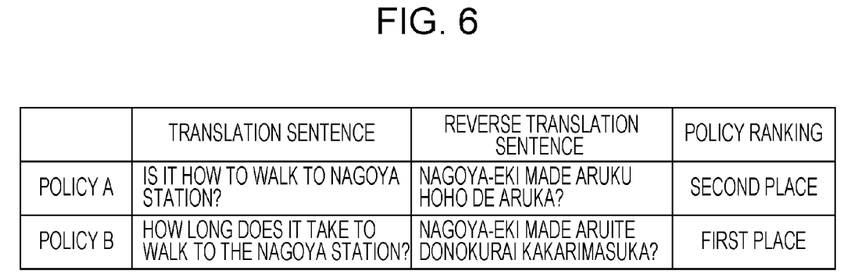
FIG. 6 is a first translation example performed by the translation system in this embodiment.

In FIG. 6, a first translation example performed by the translation system in this embodiment is depicted.

In the first translation example, an input sentence is "Nagoya-eki made aruite dorekurai desuka?". A translation sentence A by the policy A is "Is it how to walk to Nagoya Station?", and a reverse translation sentence A is "Nagoya-eki made aruku hoho de aruka?". Moreover, a translation sentence B by the policy B is "How long does it take to walk to the Nagoya Station?", and a reverse translation sentence B is "Nagoya-eki made aruite donokurai kakarimasuka?". The degree of similarity between the original sentence and the reverse translation sentence A is determined, and the degree of similarity between the original sentence and the reverse translation sentence B is determined. Various methods have been known as the method for determining the degree of similarity between sentences. For example, if the number of disparities (the sum of deletion and insertion) in units of characters is subtracted from the number of matches in units of characters, as for the policy A, the number of matches (9)–the number of disparities (8+5)=(−4) and, as for the policy B, the number of matches (14)–the number of disparities (3+6)=(5), and the degree of similarity of the policy B is higher than the degree of similarity of the policy A and, in the translation policy ranking, the policy B is ranked in the first place and the policy A is ranked in the second place.

Figure 7:
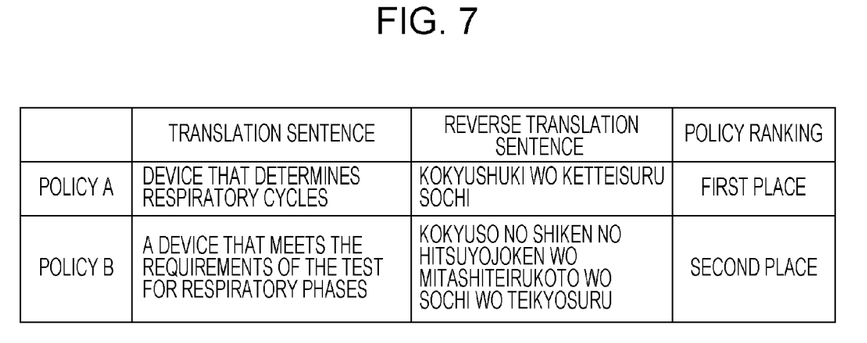
FIG. 7 is a second translation example performed by the translation system in this embodiment.

In FIG. 7, a second translation example performed by the translation system in this embodiment is depicted.

In the second translation example, an input sentence is "Kokyuso wo hanteisuru sochi". A translation sentence A by the policy A is "Device that determines respiratory cycles", and a reverse translation sentence A is "Kokyushuki wo ketteisuru sochi". Moreover, a translation sentence B by the policy B is "A device that meets the requirements of the test for respiratory phases", and a reverse translation sentence B is "Kokyuso no shiken no hitsuyojoken wo mitashiteirukoto wo sochi wo teikyosuru". The degree of similarity between the original sentence and the reverse translation sentence A is determined, and the degree of similarity between the original sentence and the reverse translation sentence B is determined. Various methods have been known as the method for determining the degree of similarity between sentences. For example, if the number of disparities (the sum of deletion and insertion) in unit of characters is subtracted from the number of matches in units of characters irrespective of the order, as for the policy A, the number of matches (8)–the number of disparities (2+3)=(3) and, as for the policy B, the number of matches (8)–the number of disparities (2+21)=(−15), and the degree of similarity of the policy A is higher than the degree of similarity of the policy B and, in the translation policy ranking, the policy A is ranked in the first place and the policy B is ranked in the second place.

In the first translation example and the second translation example, the natures of the input sentences are different and the translation policy ranking results are also different.

Figure 8:
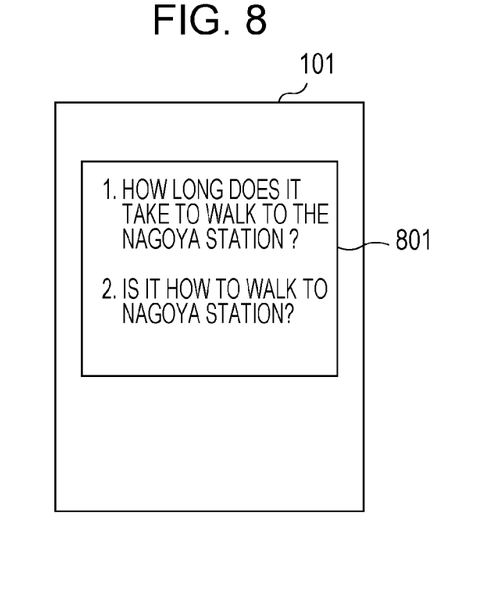
FIG. 8 is an example of the display of the first translation example performed by the translation system in this embodiment.

In FIG. 8, an example of display of the first translation example performed by the translation system in this embodiment is depicted. For example, in a translation sentence display area 801 of the device 101 provided with the output displaying portion 3000, the translation sentences are displayed in the order corresponding to the translation policy ranking results. Here, the output displaying portion 3000 may omit display of the translation sentence in the second place and translation sentences which are lower in rank. Moreover, if the translation sentence A and the translation sentence B are the same sentence, it is simply necessary to display one translation sentence and there is no need to perform reverse translation and translation policy ranking.

Furthermore, the device 101 may accept, by a touch operation or the like, a selection of any one of a plurality of displayed translation results from the user. That is, the user checks the display depicted in FIG. 8 and can select an intended sentence. Here, for example, in the case of an application or the like that supports the conversation between people who use different languages by performing voice output of the translation results, the device 101 simply has to perform voice output of the translation result selected by the user. When, in particular, the present disclosure is applied to such an application, since the translation results are displayed in the order corresponding to the ranking results, the user can easily select a correct translation result, which makes it possible to support smooth communication. In addition, if the user selects the translation result displayed in the first place but cannot communicate with the conversation partner, the user simply has to select the translation result in the second place and make the device 101 perform voice output, which allows the user to make the device 101 perform voice output of the translation results in descending order of possibility.

Incidentally, in FIG. 8, only the plurality of translation sentence results of the translation performed by different policies are depicted, but the results of reverse translation may also be displayed near the corresponding translation results. This allows the user to make a selection while checking whether or not the translation sentence in a higher rank is surely close to his/her intended translation result.

Moreover, after accepting the selection made by the user, the policy ranking calculation method (for example, calculation of the degree of similarity described above) may be changed in accordance with the selection result. The ranking calculation method may be modified, for example, if the user does not select the translation result which the system ranked in the first place a predetermined number of times or more. This allows the system to learn the translation by the policy that suits the user in accordance with the habit of each user in conversation.

Incidentally, as the method of determining the degree of similarity between sentences, in addition to that described above, similar calculation may be performed in units of words or, as for a disparity portion, a conceptual distance between words may be taken into consideration by using a thesaurus. Moreover, a word may be converted into a vector by language processing using statistical language processing or a neural network and the degree of similarity between words may be calculated as the degree of similarity between vectors. Furthermore, a vector corresponding to a sentence may be derived by calculation of vectors in units of words and the degree of similarity between sentence expressions may be determined based on the degree of similarity between vectors in units of sentences.

Incidentally, a case in which there are two translation policies A and B is an example, and it is simply necessary to use two or more translation policies. Moreover, as for a language to be translated, a case in which Japanese is translated into English is an example, and other languages may be used. Furthermore, since the bidirectional translation subsystem included in the system can perform translation from Japanese to English and translation from English to Japanese, by changing the order of translation, the translation system itself can perform translation from English to Japanese, which makes it possible to make the translation system function as a bidirectional translation system.

The technique described in the above-described embodiment can be implemented in the following types of cloud service, for example. However, the type in which the technique described in the above-described embodiment can be implemented is not limited to the types which will be described below.

Incidentally, it is assumed that any apparatus, program (recording medium incorporating a program), integrated circuit, and so forth which reflect or incorporate any method described in the specification are included in the present disclosure.

(Service Type 1: Company's Data Center Type)

Figure 9:
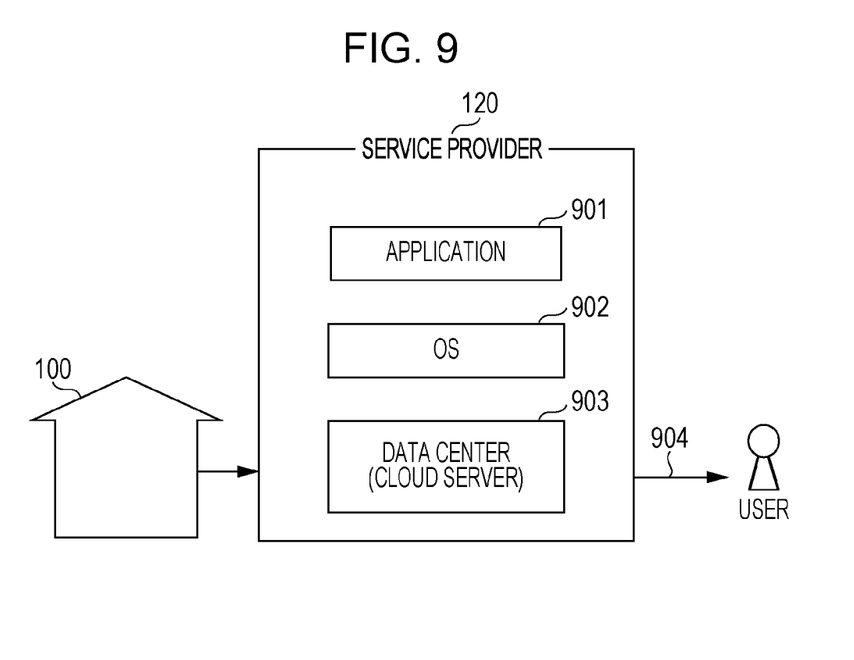
FIG. 9 is a diagram depicting a service type 1 (a company's data center type)

FIG. 9 depicts a service type 1 (a company's data center type). This type is a type in which the service provider 120 obtains information from the group 100 and provides a service to the user. In this type, the service provider 120 has the function of the data center operating company 110. That is, the service provider 120 has the cloud server 111 that manages big data. Therefore, the data center operating company 110 does not exist.

In this type, the service provider 120 operates and manages a data center (the cloud server 111) (903). Moreover, the service provider 120 manages an OS (902) and an application (901). The service provider 120 provides a service by using the OS (902) and the application (901) managed by the service provider 120 (904).

(Service Type 2: IaaS Use Type)

Figure 10:
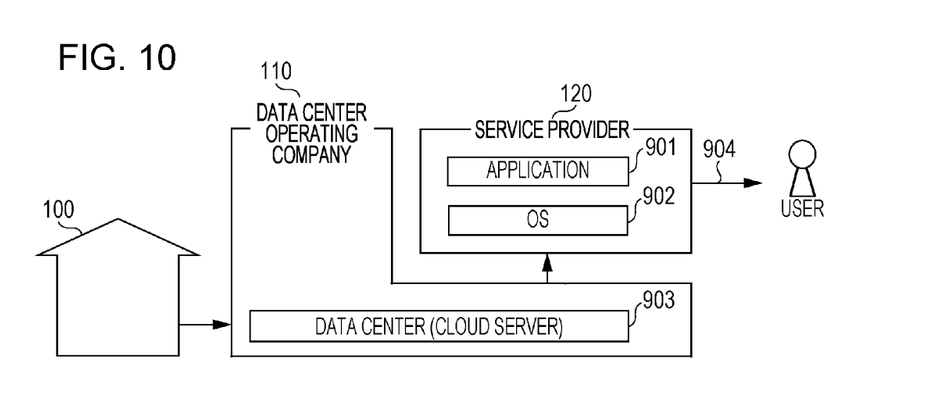
FIG. 10 is a diagram depicting a service type 2 (an IaaS use type)

FIG. 10 depicts a service type 2 (an IaaS use type). Here, IaaS is an abbreviation of infrastructure as a service and is a cloud service providing model that provides an infrastructure itself for constructing and operating a computer system as a service provided via the Internet.

In this type, the data center operating company 110 operates and manages the data center (the cloud server 111) (903). Moreover, the service provider 120 manages the OS (902) and the application (901). The service provider 120 provides a service by using the OS (902) and the application (901) managed by the service provider 120 (904).

(Service Type 3: PaaS Use Type)

Figure 11:
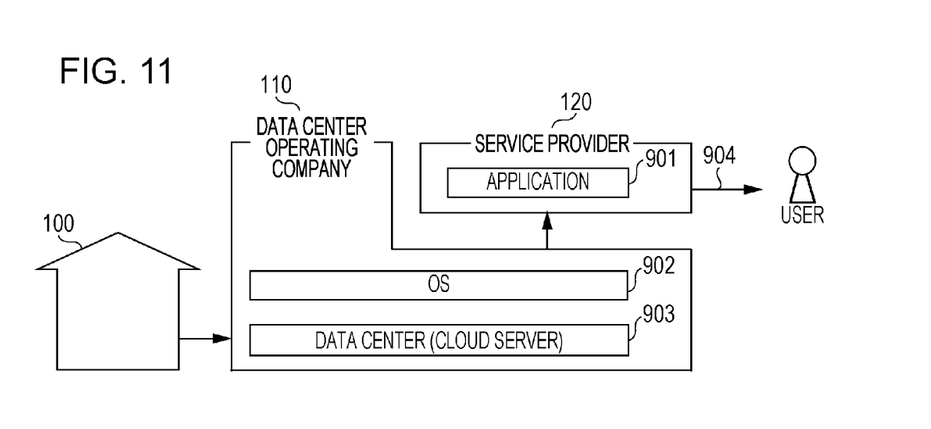
FIG. 11 is a diagram depicting a service type 3 (a PaaS use type)

FIG. 11 depicts a service type 3 (a PaaS use type). Here, PaaS is an abbreviation of platform as a service and is a cloud service providing model that provides a platform which is a base for constructing and operating software as a service provided via the Internet.

In this type, the data center operating company 110 manages the OS (902) and operates and manages the data center (the cloud server 111) (903). Moreover, the service provider 120 manages the application (901). The service provider 120 provides a service by using the OS (902) managed by the data center operating company 110 and the application (901) managed by the service provider 120 (904).

(Service Type 4: SaaS Use Type)

Figure 12:
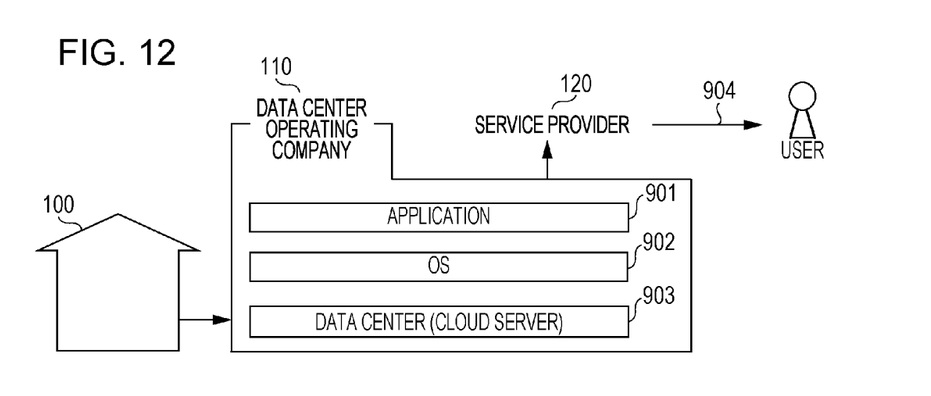
FIG. 12 is a diagram depicting a service type 4 (an SaaS use type).

FIG. 12 depicts a service type 4 (an SaaS use type). Here, SaaS is an abbreviation of software as a service. For example, SaaS is a cloud service providing model having the function of making it possible for a company and an individual (user) without a data center (a cloud server) to use an application which is provided by a platform provider with a data center (a cloud server) via a network such as the Internet.

In this type, the data center operating company 110 manages the application (901), manages the OS (902), and operates and manages the data center (the cloud server 111) (903). Moreover, the service provider 120 provides a service by using the OS (902) and the application (901) managed by the data center operating company 110 (904).

As described above, in any type, it is assumed that the service provider 120 provides a service. Moreover, for example, the service provider 120 or the data center operating company 110 may develop a database or the like of an OS, an application, or big data or outsource the development thereof to a third party.

This translation method can be industrially applied to a mobile translation terminal for tourists, a conversation assisting apparatus for business operations in which foreign people take part, a foreign language learning apparatus, a robot that can communicate with people in multiple languages, and so forth.

What is claimed is:

1. A translation method comprising:
   obtaining an original sentence to be translated;

performing bidirectional translation to obtain a translation sentence corresponding to the original sentence by performing forward translation and obtain a reverse translation sentence from the translation sentence by performing reverse translation, consistently for each of a plurality of translation policies;

ranking the plurality of translation policies based on a degree of similarity between the reverse translation sentence of each of the plurality of translation policies and the original sentence; and displaying the translation sentence of each of the plurality of translation policies in a state in which each translation sentence is related to the ranking, wherein the forward translation and the reverse translation are performed consistently for each of the plurality of translation policies.

2. The translation method according to claim 1, wherein in the performing bidirectional translation, when the original sentence is written in a first language, a first translation sentence is obtained by translating the original sentence into a second language by a first translation policy, a first reverse translation sentence is obtained by performing the reverse translation of the first translation sentence into the first language by the first translation policy, a second translation sentence is obtained by translating the original sentence into the second language by a second translation policy, and a second reverse translation sentence is obtained by performing the reverse translation of the second translation sentence into the first language by the second translation policy.

3. The translation method according to claim 2, wherein in the ranking, a first degree of similarity between the original sentence and the first reverse translation sentence is calculated, a second degree of similarity between the original sentence and the second reverse translation sentence is calculated, the first degree of similarity and the second degree of similarity are compared, and the first translation sentence and the second translation sentence are ranked in descending order of degree of similarity.

4. The translation method according to claim 3, wherein in the displaying, the first translation sentence and the second translation sentence ranked in the ranking are displayed in such a way that a translation sentence in a higher rank is displayed in an upper portion of a display.

5. The translation method according to claim 1, wherein the degree of similarity is a value obtained by subtracting a number of disparities in units of words between the reverse translation sentence and the original sentence from a number of matches in units of words between the reverse translation sentence and the original sentence.

6. The translation method according to claim 1, wherein at least one of the plurality of translation policies is an algorithm reflecting a design guide of machine translation.

7. A translation system comprising:

a processor; and a recording medium having stored therein instructions which, when executed by the processor, cause the processor to perform operations comprising:

obtaining an original sentence to be translated, generating, for each of a plurality of translation policies, a translation sentence corresponding to the original sentence by performing forward translation and generating a reverse translation sentence from the translation sentence by performing reverse translation, ranking the plurality of translation policies based on a degree of similarity between the reverse translation sentence of each of the plurality of translation policies and the original sentence, displaying the translation sentence of each of the plurality of translation policies on a display in a state in which each translation sentence is related to the ranking, and wherein in the generating, the forward translation and the reverse translation are performed consistently for each of the plurality of translation policies.

8. The translation method according to claim 1, wherein in the obtaining, the original sentence is obtained by inputting the original sentence to a touch panel by a user, and in the displaying, the translation sentence of each of the plurality of translation policies is displayed on the touch panel.

9. The translation method according to claim 8, further comprising:

displaying the reverse translation sentence of each of the plurality of translation policies near a corresponding translation sentence.

10. The translation method according to claim 1, wherein in the obtaining, the original sentence is obtained by inputting the original sentence to a keyboard by a user, and in the displaying, the translation sentence of each of the plurality of translation policies is displayed on a display.

11. The translation method according to claim 10, further comprising:

displaying the reverse translation sentence of each of the plurality of translation policies near a corresponding translation sentence.

12. The translation method according to claim 1, wherein in the obtaining, the original sentence is obtained by inputting the original sentence to a microphone by a user, the microphone having speech recognition, and in the displaying, the translation sentence of each of the plurality of translation policies is displayed on a display.

13. The translation method according to claim 12, further comprising:

displaying the reverse translation sentence of each of the plurality of translation policies near a corresponding translation sentence.

14. The translation method according to claim 1, wherein in the obtaining, the original sentence is obtained by inputting the original sentence to an inputting apparatus by a user, the inputting apparatus including a touch panel, a keyboard, and microphone, and in the displaying, the translation sentence of each of the plurality of translation policies is displayed on a display.

15. The translation method according to claim 14, further comprising:

displaying the reverse translation sentence of each of the plurality of translation policies near a corresponding translation sentence.

\* \* \* \* \*